Figure 5:
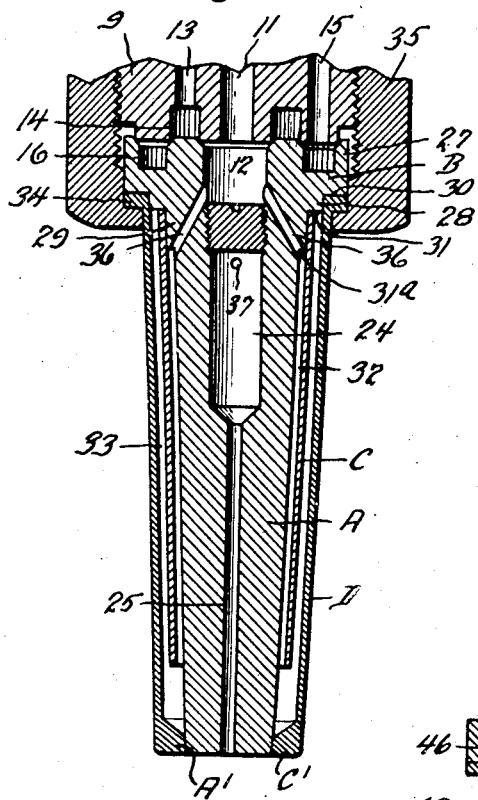

March 22, 1932.   L. CAMPBELL, JR   1,850,379
APPARATUS FOR UTILIZING OXYGEN IN TREATMENT OF METALS
Filed March 23, 1929   2 Sheets-Sheet 1
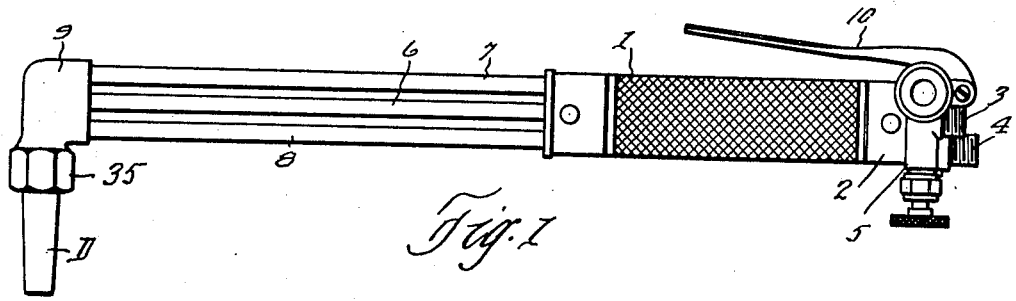
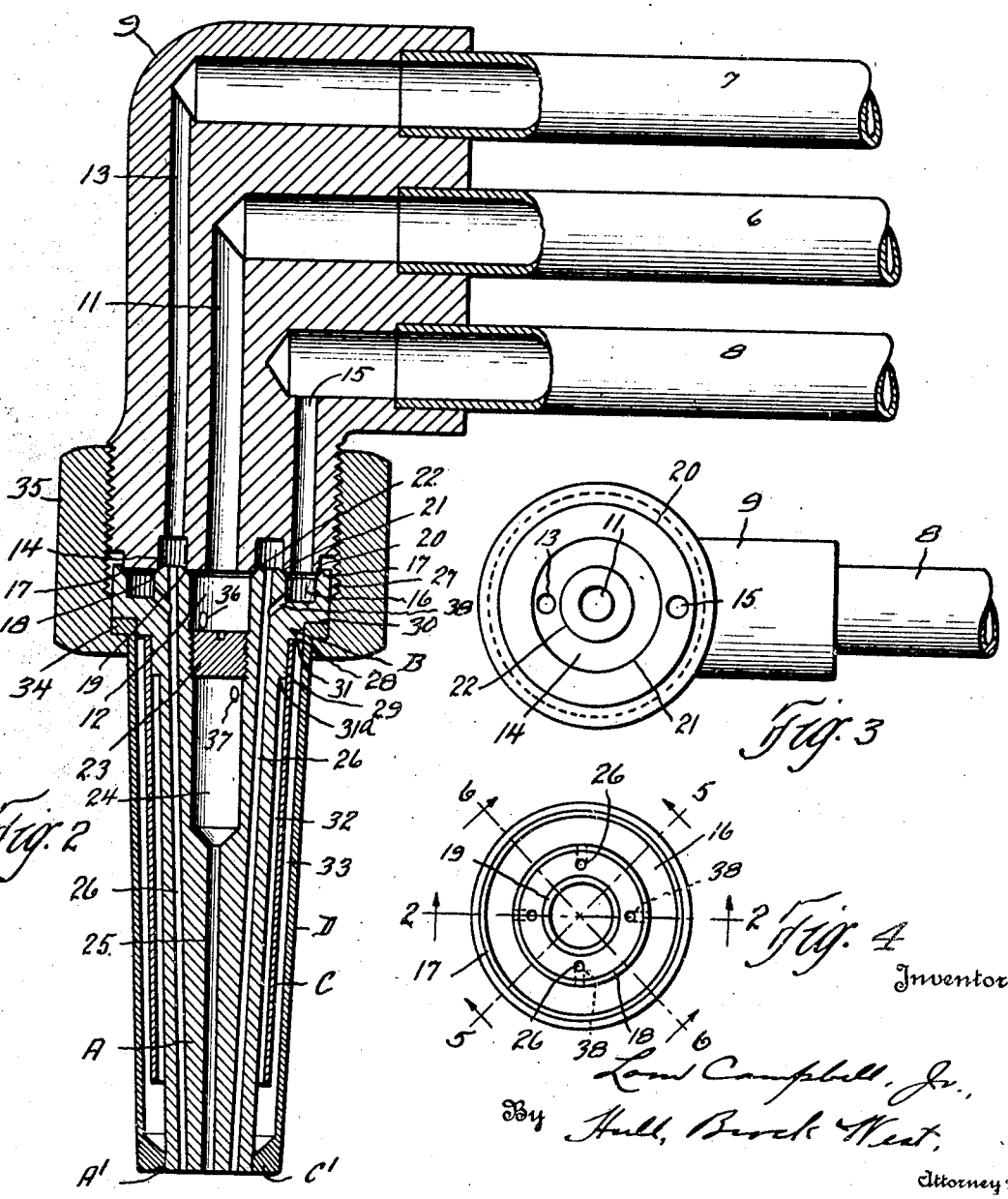
Inventor
Lewis Campbell, Jr.
By Hull, Brock & West
Attorneys Patented Mar. 22, 1932

1,850,379

UNITED STATES PATENT OFFICE

LORN CAMPBELL, JR., OF LAKEWOOD, OHIO

APPARATUS FOR UTILIZING OXYGEN IN TREATMENT OF METALS

Application filed March 23, 1929. Serial No. 349,322.

This invention relates to apparatus for utilizing oxygen in the heat treatment of metals, and especially for such purposes as the cutting and welding of metals, and the fusing of large masses of metals.

It is the general purpose and object of the invention to provide an apparatus for the purposes specified which will not only effect a marked saving in the amount of oxygen required for the uses specified, but which also will prolong greatly the life of the apparatus.

Further and more detailed objects of the invention will appear hereinafter and will be realized through the construction and arrangement of parts shown in the drawings, wherein two embodiments of the invention are illustrated.

Figure 6:
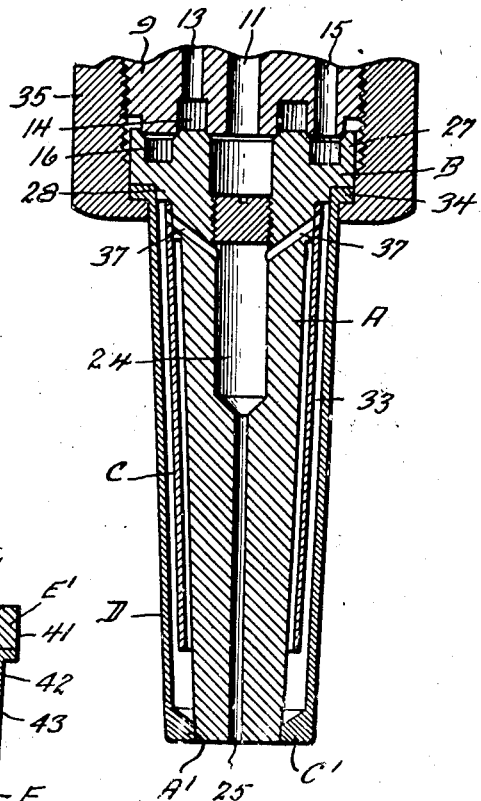

Referring to said drawings, Fig. 1 represents a side elevation of a torch or blowpipe by means of which my invention may be utilized; Fig. 2, a longitudinal central sectional view through the head and tip of the blowpipe shown in Fig. 1, the section being taken in a plane corresponding to the line 2—2 of Fig. 4; Fig. 3, a bottom plan view of the lower delivery end of the blowpipe head; Fig. 4, a plan view of the tip; Figs. 5 and 6 are details in section corresponding respectively to the lines 5—5 and 6—6 of Fig. 4, and showing the cooperating portions of the blowpipe head and gland nut; and Fig. 7, a central longitudinal view through a welding tip constructed in accordance with my invention.

In the operation of the ordinary blowpipe, the acetylene (or other combustible gas) is supplied thereto from tanks wherein the acetylene is subjected to a pressure of from 150 to 200 pounds per square inch. The oxygen, however, is dispensed from tanks wherein it is subjected to a pressure of approximately 2000 pounds. This means that, when introduced into the point of mixing in a blowpipe, the oxygen (due to its greater expansion) is much colder than the combustible gas, with the result that a large amount of heat is required to raise it to the combining temperature. Furthermore, the tips of these pipes are exposed to the heat generated and reflected as a necessary incident to the cutting and welding operations, with the result that the tips burn up and require frequent replacement.

I am enabled to overcome the objections referred to, with a marked increase in efficiency in operation and in the life of the tips of blowpipes and similar apparatus for treating metal with oxygen, by the construction shown in the drawings, which will now be described in detail.

Referring first to Figs. 1 to 6, inclusive, 1 represents the handle of a blowpipe having at one end a valve block 2 provided with connections 3 and 4 for the oxygen and combustible gas. The valve block may be of any preferred construction having valves 5 and passages therein for supplying the gases mentioned to pipes 6, 7 and 8 leading to the blowpipe head 9. The pipe 6 conducts cutting oxygen to the head 9, the flow of such oxygen being controlled by a lever 10 which is adapted to be grasped by the operator, together with the handle 1, as is common in the blowpipe art. The cutting oxygen is delivered to a central vertical passage 11 in said head and thence into a central chamber 12 in the top of the blowpipe tip, which will be described hereinafter.

The preheating oxygen is delivered by the pipe 7 to a vertical passage 13 in the head, the lower end of the passage discharging into an annular chamber 14 formed in the bottom of the head and surrounding the passage 11. The combustible gas is conducted by the pipe 8 to a vertical passage 15 in the head, the bottom of which passage discharges into an annular chamber 16 in the tip, surrounding the chamber 12.

The tip comprises an inner member, indicated generally at A, having the chambers 12 and 16 in its upper end, the tops of the walls of the said chambers being beveled, as shown at 17, 18 and 19, whereby tight seats may be formed between these beveled surfaces and the cooperating annular seating portions 20, 21 and 22 on the bottom of the blowpipe head. The bottom of the chamber 12 in the inner tip member is shown as formed by a plug 23 threaded thereinto, below which plug there is a central chamber 24 from which a central bore 25 extends to the delivery end of the tip member. Surrounding this chamber 24 and the bore 25 are passages 26 which communicate at their upper ends with the chamber 14 and extend through the lower or delivery end of the tip, converging downwardly toward the central bore. The upper portion of the inner tip member is formed as a head B having an upper cylindrical surface 27 and lower frusto-conical surfaces 28 and 29 with horizontally extending annular surfaces 30, 31 and 31ª forming shoulders below the surfaces 27, 28 and 29, respectively. The inner tip member is frusto-conical in shape below the shoulder 31ª.

C denotes a tapered or frusto-conical sleeve which is secured to the frusto-conical surface 29 and which extends downwardly around the inner member A but terminates short of the lower or delivery end thereof, forming a narrow annular space 32 around the inner tip member.

D denotes a second frusto-conical sleeve surrounding the sleeve C and providing therewith an annular space or chamber 33. The sleeve D fits at its upper end about the surface 28 and has a flange 34 by means of which it is clamped against the annular surface or shoulder 30 by the gland nut 35 which secures the tip to the bottom of the head 9. The sleeve D extends the full length of the outer tip member and has its lower end formed into a heavy inturned flange C' the inner edge of which forms a leak-proof joint with the bottom of the inner tip member.

Ports 36 conduct cutting oxygen from the chamber 12 to the annular space or chamber 32, and ports 37 conduct such cutting oxygen from the annular space or chamber 33 to the central chamber 24, whence the oxygen is delivered to and through the central bore 25. Preheating oxygen is delivered into the upper ends of the passages 26, and the combustible gas is admitted into such passages, below such upper ends, by ports 38 communicating with the passages and with the chamber 16.

The outer sleeve D will be made of metal having good heat conductive qualities, and the same is preferably true of the inner sleeve C.

Figure 7:
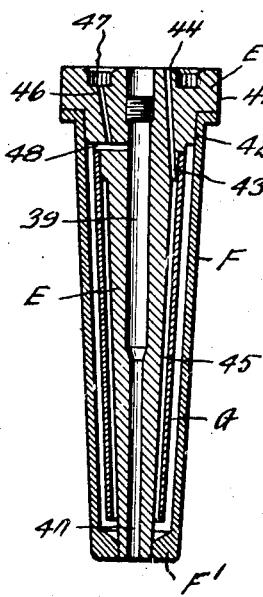

In operating the blowpipe just described, the preheating will be effected in the usual manner. However, the oxygen admitted through the pipe 6 will be delivered through concentric annular expansion chambers surrounding the inner tip member and will be reversed in its flow from the inner chamber to and through the outer chamber and again from the outer chamber to and through the bore 25. The oxygen, being thus expanded, cools the parts of the tip which are exposed to the heat reflected or generated in the operation of the pipe or torch, thus preventing back-fire and pre-ignition of gases. Its temperature is raised by exposure to such heat, with the result that its initial temperature is materially raised thereby increasing its efficiency and the efficiency of the blowpipe: in fact, by virtue of such preheating, materially less oxygen is required for the preheating operation as well as for the chemical reaction of the cutting oxygen with the metal. In practice a saving of from 25% to 33% has been accomplished by a blow-pipe constructed as shown and described herein. In Fig. 7 there is shown a welding tip by which my invention may be realized, which tip may be applied to the head shown in Figs. 1, 2 and 3. In this form of my invention the inner tip member is indicated at E and is provided with a central chamber or enlarged bore 39 from which the central bore 40 extends to the delivery end of the tip. The head E' is provided with the cylindrical surface 41 and the frusto-conical surfaces 42 and 43, corresponding respectively to the surfaces 27, 28 and 29 in the preceding modification. The outer sleeve member F is fitted about the surface 42 and the inner sleeve member G is fitted about the surface 43, the lower end of the outer sleeve having a heavy inturned flange F' through which the bottom of the inner tip member extends and with which it forms a leak-proof joint. The head E' is provided with one or more ports 44 communicating at their lower ends with the inner annular space or chamber 45 and at their upper ends with the chamber 14 in the blowpipe head. The head E' is also provided with one or more ports 46 each of which communicates at its upper end with an annular chamber 47 formed in the head E' and which is adapted to communicate with the passage 15 for preheating oxygen in the blowpipe head. The lower end of each passage 46 communicates with a transverse port 48 which delivers the preheating oxygen into the central chamber 39.

In the operation of a welding torch constructed in accordance with my invention, the oxygen is expanded in the same manner as in the operation of the cutting torch; serves to cool the parts of the tip which are exposed to the greatest action of the heat, whereby the life of the tip is greatly prolonged; and, in addition to being itself preheated by such exposure, also heats the combustible gas whereby the efficiency of the blowpipe in the welding operation is greatly enhanced.

Having thus described my invention, what I claim is:

1. A blowpipe tip comprising an inner member having a central bore and a plurality of passages extending substantially the full length of said tip and grouped about said bore, and an outer tip member secured to the inner tip member and having therein an extended conduit constituting an expansion chamber for oxygen, one end of such conduit communicating with the said central bore.

2. A blowpipe tip comprising an inner member having a central bore and a plurality of passages extending therethrough and grouped about said bore, and concentric outer tip members surrounding the inner tip member and providing expansion passages extending to the extreme end of said tip and longitudinally thereof in reverse directions and through which passages the cutting oxygen may be circulated and delivered into the central bore.

3. A blowpipe tip having a delivery passage or bore and provided between such passage or bore and the exterior thereof with an extended duct constituting an expansion chamber for oxygen, there being one or more ports placing said expansion chamber in communication with the delivery passage or bore, said duct extending the full length of said tip.

4. A blowpipe tip comprising an inner member having a central bore and a plurality of passages extending therethrough and grouped about said bore, an inner sleeve secured to the upper portion of said inner tip member and extending downwardly and spaced from said inner member, an outer sleeve also secured to the inner tip member and surrounding the inner sleeves and extending below the same, the said sleeve forming concentric chambers surrounding the inner tip member, the said tip also having means whereby oxygen may be circulated through and from one of said chambers into and through the other chamber and thence delivered into the central bore, said chambers extending to the extreme end of said tip.

5. A blowpipe tip comprising an inner member having a central bore and a plurality of passages extending therethrough and grouped about said bore, an inner sleeve secured to the upper portion of said inner tip member and extending downwardly and spaced from the inner tip member, an outer sleeve also secured to the inner tip member and surrounding the inner sleeve and extending below the same and having its lower end engaging the lower end of the inner tip member, the said sleeves forming concentric chambers surrounding the inner tip member, the said tip also having means whereby oxygen may be circulated through and from one of said chambers into and through the other chamber, and thence delivered into the central bore.

6. A blowpipe tip adapted to be detachably secured to the blowpipe head comprising an inner member having a central bore and a plurality of passageways extending therethrough and grouped about said bore, an outer tip member surrounding said inner member and providing therewith an annular space or chamber extending the full length of the outer tip member and forming a leak-proof joint with the outer end of said inner member, an inner sleeve-like member arranged within said outer tip member and extending downwardly around said inner member in spaced relation thereto and cooperating with said outer tip member to define a pair of concentric passageways or bores extending substantially the full length of said tip, said members constituting the expansion chamber for oxygen, one end of such passageway communicating with said central bore.

7. A blow-pipe tip including, an inner member provided with a passage, an outer member surrounding said inner member and contacting the same in a leak-proof joint of restricted extent at the extreme end and spaced therefrom for most of its length, an intermediate member between said members, spaced from both for most of its length and terminating short of the point of contact thereof, and means formed in, associated with and cooperating with said members for causing oxygen to flow around said intermediate member prior to discharge from said passage.

8. A blowpipe tip comprising an inner member having a central bore therethrough, an outer member surrounding the inner member and extending to substantially the end of the inner member, there being a leak-proof connection between the delivery end of the inner member and the corresponding end of the outer member, and means for circulating oxygen downwardly substantially to the lower ends of the inner and outer members and then upwardly between the bore of the inner member and the outer member and delivering oxygen into such bore whereby the oxygen is expanded and the delivery end of the tip is maintained cool.

9. A blowpipe tip having an interiorly arranged bore and reversely extending passages arranged between the bore and the exterior thereof, the lower ends of the passages extending substantially to the delivery end of the tip, and means for circulating oxygen through the said passages serially and for delivering the oxygen to the said bore, whereby the oxygen is expanded in its course through said passages and the delivery end of the tip is simultaneously cooled.

In testimony whereof, I hereunto affix my signature.

LORN CAMPBELL, Jr.